J. TODD.

Water-Wheel.

No. 8,942. Reissued Oct. 21, 1879.

Attest,
W. H. H. Knight,
M. Schmeckly

Inventor,
John Todd.
By S. S. Fisk
Attorney.

N. PETERS, PHOTO-LITHOGRAPHER, WASHINGTON, D. C.

UNITED STATES PATENT OFFICE.

JOHN TODD, OF EASTON, PENNSYLVANIA.

IMPROVEMENT IN WATER-WHEELS.

Specification forming part of Letters Patent No. 66,651, dated July 9, 1867; Reissue No. 8,942, dated October 21, 1879; application filed August 2, 1879.

*To all whom it may concern:*

Be it known that I, JOHN TODD, of Easton, in the county of Northampton and State of Pennsylvania, have invented certain new and useful Improvements in Water-Wheels; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
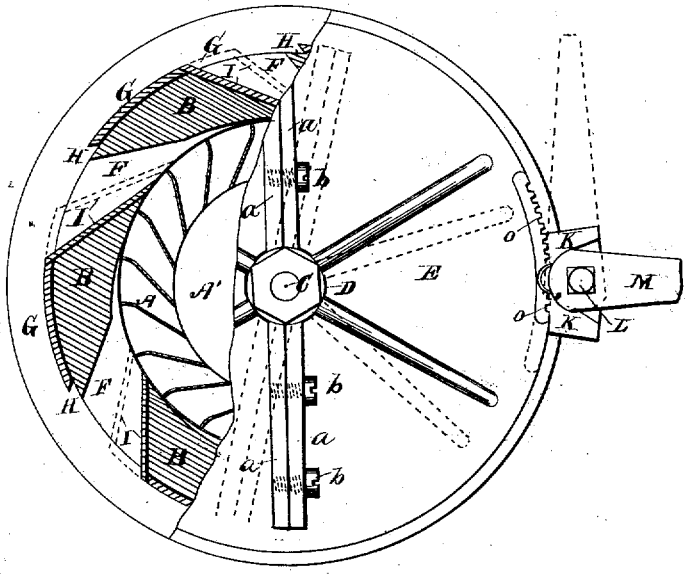
Figure 2:
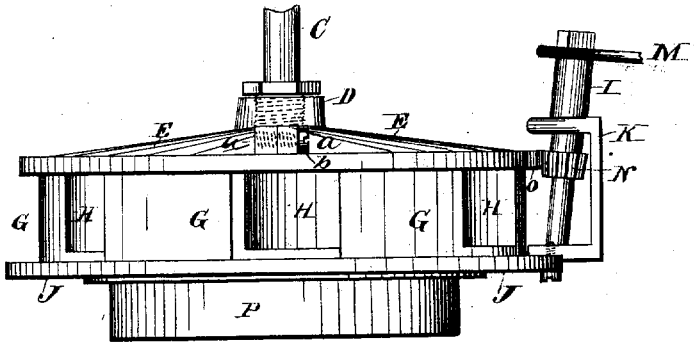

In the drawings, Figure 1 is a top-plan view, partly in section, to show the interior of the wheel. Fig. 2 is a side elevation of the wheel.

Like letters of reference denote like parts.

My invention consists in the particular manner in which I construct and operate the gates in the chutes or water-ways of the wheel, by which construction and operation I am enabled to contract or enlarge the water-ways without changing their inclination or the shape of their cross-sections; or, in other words, I contract or enlarge the water-ways without changing the angle at which the water strikes the wheel; and to this end I surround the curb of the water-wheel with a flange or ring, which flange or ring may or may not be attached to or form a part of the deck of the water-wheel.

I provide the flange or ring with openings or water-ways opposite to the water-ways or chutes in the curb. To one side of each opening in the flange or ring I rigidly attach a gate, which gate extends into and nearly through the water-ways or chutes in the curb, and forms one of the vertical sides of the same, by which construction it is evident that whenever the flange or ring is turned on the curb each and every chute or water-way will be either contracted or enlarged, as desired. It is also evident that the angle at which the water strikes the wheel will at all times remain the same, whether the chutes be enlarged or contracted, because the vertical sides of said chutes will maintain at all times the same angle with the perimeters of the curb and flange or ring, respectively.

I am aware that gates have been pivoted or hinged in the water-ways or chutes of water-wheels for the purpose of enlarging or contracting said water-ways; but such gates, whether hinged in their centers or at their ends, by every movement change the shape, form, and area of the water-way, and also change the angle or inclination at which the water strikes the wheel. This is true from the fact that the points at or around the pivots practically do not change position, while every other part, from the pivots to the ends, is moved to a greater or less extent. Such unequal variation is not the case in my construction of gates, which, although movable, and thereby capable of changing the size of the water-ways or chutes, yet retain at all and every movement the same angle with the perimeter of the water-wheel, as before described.

In the subjoined description of the drawings I have assumed the flange or ring and gates to be a part of or attached to the deck of the wheel, and to be moved about the perimeter of the curb by motion imparted to said deck by suitable described mechanism; but I do not limit myself to the construction as described, as the flange or ring and gates may be separate from and moved independent of the deck by gearing or other suitable mechanism.

Instead of the ring and gearing being placed above the chutes, they may be placed on the under flange, J, that projects from the cylinder P, in which cylinder, and at its interior under part, the bridge-tree that supports the wheel is placed.

Whether the deck be stationary or movable, I propose to make it in two sections, so that it may be easily removed to give access to the wheel.

Referring to the drawings, A is a water-wheel of any of the well-known kinds, placed and supported within a curb B. The wheel is made in two portions, the outer portion, A, being secured to the inner portion, A′, by bolts or other suitable means.

C is the driving-shaft, the lower end of which passes downward through a box, D, in or on the deck E, and is secured in a sleeve or hub in the central portion, A′, of the water-wheel.

The deck E is made in two parts or sections, being divided centrally, and secured together by means of flanges *a a*, cast upon them, and bolts *b b*, passing through said flanges. By this arrangement I am enabled to remove the deck E, in whole or in part, without disturbing the curb or water-wheel.

To the under side of the deck, and at its periphery, is cast or otherwise secured a flange or ring, G, which fits over the curb, and through which openings H are made, which openings correspond with the openings or water-ways F in the curb.

To the flange or ring G are rigidly attached gates J, which gates extend into and nearly through the chutes or water-ways in the curb, and form one of the vertical sides of the same.

To the lower stationary flange, J, is secured a bracket, K, or other suitable support, in which a shaft, L, is placed in proper bearings, so as to be turned by a lever or hand-wheel, M.

On the shaft L is a pinion, N, which meshes into a segmental rack, O, cast or otherwise secured upon the deck E, so that when the shaft L is turned the deck and all its attached parts may and will be moved to any desired extent.

In the drawings, the water-ways are shown by dotted lines as contracted by the movement of the flange or ring G and gates I. It will be observed that the openings in the curb at the rear of the gates, when the water-ways are thus contracted, are covered by the flange or ring.

Having thus described my invention, what I claim as new is—

1. In combination with a water-wheel, A, and curb B, provided with water-ways or chutes F, leading to the wheel, a flange, ring, or band, G, surrounding the curb, and provided with gates I, arranged to change the areas of the water-ways, substantially as described.

2. In a water-wheel, the combination of the wheel A and curb B, provided with water-ways or chutes F, with a flange, ring, or band, G, having gates I rigidly attached thereto, arranged to regulate the flow of the water, and at all times to retain the same angle at which the water strikes the wheel, substantially as herein set forth and described.

In testimony that I claim the foregoing I have hereunto set my hand this 24th day of May, 1879.

JOHN TODD.

Witnesses:
WINSLOW WOOD,
JNO. W. LEPP.